(12) United States Patent
Raasch (10) Patent No.: US 12,011,112 B1
(45) Date of Patent: Jun. 18, 2024

(54) LEVELING DEVICE FOR AN APPARATUS

(71) Applicant: Andrew Raasch, Harvard, IL (US)

(72) Inventor: Andrew Raasch, Harvard, IL (US)

( * ) Notice: Subject to any disclaimer, the term of this patent is extended or adjusted under 35 U.S.C. 154(b) by 16 days.

(21) Appl. No.: 18/113,926

(22) Filed: Feb. 24, 2023

(51) Int. Cl.
*A47J 37/07* (2006.01)

(52) U.S. Cl.
CPC .................. *A47J 37/0786* (2013.01)

(58) Field of Classification Search
CPC .............. A47J 37/0786; F16M 13/022; F16M 2200/025; F16M 2200/08
USPC ...................................... 248/354.3
See application file for complete search history.

(56) References Cited

U.S. PATENT DOCUMENTS

| | | | |
|---|---|---|---|
| 3,651,796 A | 3/1972 | Nelson | |
| 3,904,158 A * | 9/1975 | Michael | F24F 13/32 248/172 |
| 3,917,211 A * | 11/1975 | Daunderer | B60N 2/1853 248/421 |
| 4,541,406 A * | 9/1985 | DaSambiagio | F24B 1/205 99/446 |
| 4,977,824 A | 12/1990 | Shinler | |
| 5,178,126 A | 1/1993 | Beller | |
| 5,746,138 A * | 5/1998 | Hirose | B25J 9/106 108/143 |
| 6,237,586 B1 | 5/2001 | Fontes | |
| 6,289,885 B1 | 9/2001 | Szadurski | |
| 6,609,512 B2 | 8/2003 | Poe, Jr. et al. | |
| 7,647,923 B2 * | 1/2010 | Dahl | A47J 37/0731 126/25 AA |
| 9,277,840 B2 * | 3/2016 | Ikeda | A47J 37/0704 |
| 10,376,095 B2 | 8/2019 | Smith et al. | |
| 11,229,318 B2 | 1/2022 | Smith et al. | |
| 2014/0326230 A1 * | 11/2014 | Hall | F16M 7/00 248/188.7 |
| 2016/0264038 A1 * | 9/2016 | Parkes | F16M 11/22 |
| 2023/0056438 A1 * | 2/2023 | Marquez | A47J 37/0786 |

* cited by examiner

*Primary Examiner* — Monica E Millner
(74) *Attorney, Agent, or Firm* — Salter & Michaelson (57) ABSTRACT

A leveling device for adjusting the height of a leg member that is meant for the support of an item. The leveling device includes: a first support block having a base and a first tapered surface; a second support block having a base and a second tapered surface; said first and second support blocks constructed and arranged with the respective tapered surfaces in facing relationship; a platform upon which the legs rests; said platform having opposed ends that engage with respective first and second tapered surfaces of the respective first and second support blocks; and a leadscrew that connects between the respective first and second blocks in order to move the respective first and second support blocks toward and away from each other. The movement of the respective first and second support blocks toward and away from each other causes the platform to respectively raise and lower in adjusting the height of the apparatus.

20 Claims, 8 Drawing Sheets

LEVELING DEVICE FOR AN APPARATUS

FIELD OF THE INVENTION

The present invention relates in general to a leveling device for adjusting the height of one or more legs of an apparatus. More particularly, the present invention relates to a leveling device that can be used in connection with the legs of a cooking grill in order to adjust the height of one or more legs of the cooking grill.

BACKGROUND OF THE INVENTION

There are provided in the prior art some means for adjusting the legs of a grilling apparatus. Reference may be made to U.S. Pat. No. 3,651,796 to Nelson and U.S. Pat. No. 6,237,586 to Fontes. With regard to the Fontes patent, it is noted that on their legs 27-30, they do provide adjustable feet members 31-34. However, this adjustment is integrally part of the leg member and it thus makes it difficult to provide an adjustment.

Accordingly, it is an object of the present invention to provide an improved leveling device for adjusting the height of a leg member that is meant for the support of an item or apparatus such as a cooking grill.

SUMMARY OF THE INVENTION

The above object is obtained in accordance with the present invention by providing a separate leveling device that the leg member rests upon. In this way the adjustment can occur independent of the leg member.

In accordance with the present invention there is provide, other object, features and advantages of the present invention there is provided a leveling device for adjusting the height of a leg member that is meant for the support of an item, said leveling device comprising:
  a first support block having a base and a first tapered surface;
  a second support block having a base and a second tapered surface;
  said first and second support blocks constructed and arranged with the respective tapered surfaces in facing relationship;
  a platform upon which the leg rests;
  said platform having opposed ends that engage with respective first and second tapered surfaces of the respective first and second support blocks;
  and a leadscrew that connects between the respective first and second blocks in order to move the respective first and second support blocks toward and away from each other;
  the movement of the respective first and second support blocks toward and away from each other causing the platform to respectively raise and lower.

In accordance with other aspects of the present invention the respective first and second tapered surfaces extend substantially at a 90 degree angle; the respective first and second tapered surfaces taper at substantially the same angle; the opposed ends of the platform are also tapered to match the respective first and second tapered surfaces of the respective first and second support blocks; the leadscrew has an operative end that can be rotated in order to move the respective support blocks toward and away from each other; including interlocking surfaces between the tapered surfaces of the respective first and second support blocks, and the ends of the platform; wherein the interlocking surfaces are formed by a slot and an accommodating slide; including a foundation upon which the respective first and second support blocks rest; wherein the foundation has a slot in which the respective first and second support blocks may slide; and wherein the item is a cooking grill having multiple legs, at least one of which is being supported by a leveling device.

In another version of the present invention there is provided a combination of a piece of equipment and a leveling device that is for adjusting the height of the piece of equipment. The piece of equipment includes at least one support leg. The leveling device comprises: a first support block having a base and a first tapered surface; a second support block having a base and a second tapered surface; said first and second support blocks constructed and arranged with the respective tapered surfaces in facing relationship; a platform upon which the support leg rests; said platform having opposed ends that engage with respective first and second tapered surfaces of the respective first and second support blocks; and an adjustment member that connects between the respective first and second blocks in order to move the respective first and second support blocks toward and away from each other; the movement of the respective first and second support blocks toward and away from each other causing the platform to respectively raise and lower, and in turn raise and lower the support leg.

In accordance with other aspects of the present invention the respective first and second tapered surfaces extend substantially at a 90 degree angle; and wherein the respective first and second tapered surfaces taper at substantially the same angle; wherein the opposed ends of the platform are also tapered to match the respective first and second tapered surfaces of the respective first and second support blocks; including interlocking surfaces between the tapered surfaces of the respective first and second support blocks, and the ends of the platform; wherein the interlocking surfaces are formed by a slot and an accommodating slide; including a foundation upon which the respective first and second support blocks rest; and wherein the foundation has a slot in which the respective first and second support blocks may slide.

In accordance with still other versions of the present invention there is provided a method of adjusting the height of an apparatus that has a plurality of support legs, the adjusting being performed by the ability to raise and lower the legs, so as to in turn raise and lower the apparatus. The method comprises providing a leveling device upon which the support legs rest, and that includes a first support block having a base and a first tapered surface; a second support block having a base and a second tapered surface; said first and second support blocks constructed and arranged with the respective tapered surfaces in facing relationship; a platform upon which the support leg rests; said platform having opposed ends that engage with respective first and second tapered surfaces of the respective first and second support blocks; and an adjustment member that connects between the respective first and second blocks, said method further comprising operating the adjustment member in order to move the respective first and second support blocks toward and away from each other; the movement of the respective first and second support blocks toward and away from each other causing the platform to respectively raise and lower, and in turn raise and lower the support legs and apparatus in order to adjust the height of the apparatus.

Other aspects of the method of the present invention include providing the opposed ends of the platform that are also tapered to match the respective first and second tapered surfaces of the respective first and second support blocks; and including providing a foundation upon which the respective first and second support blocks rest.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
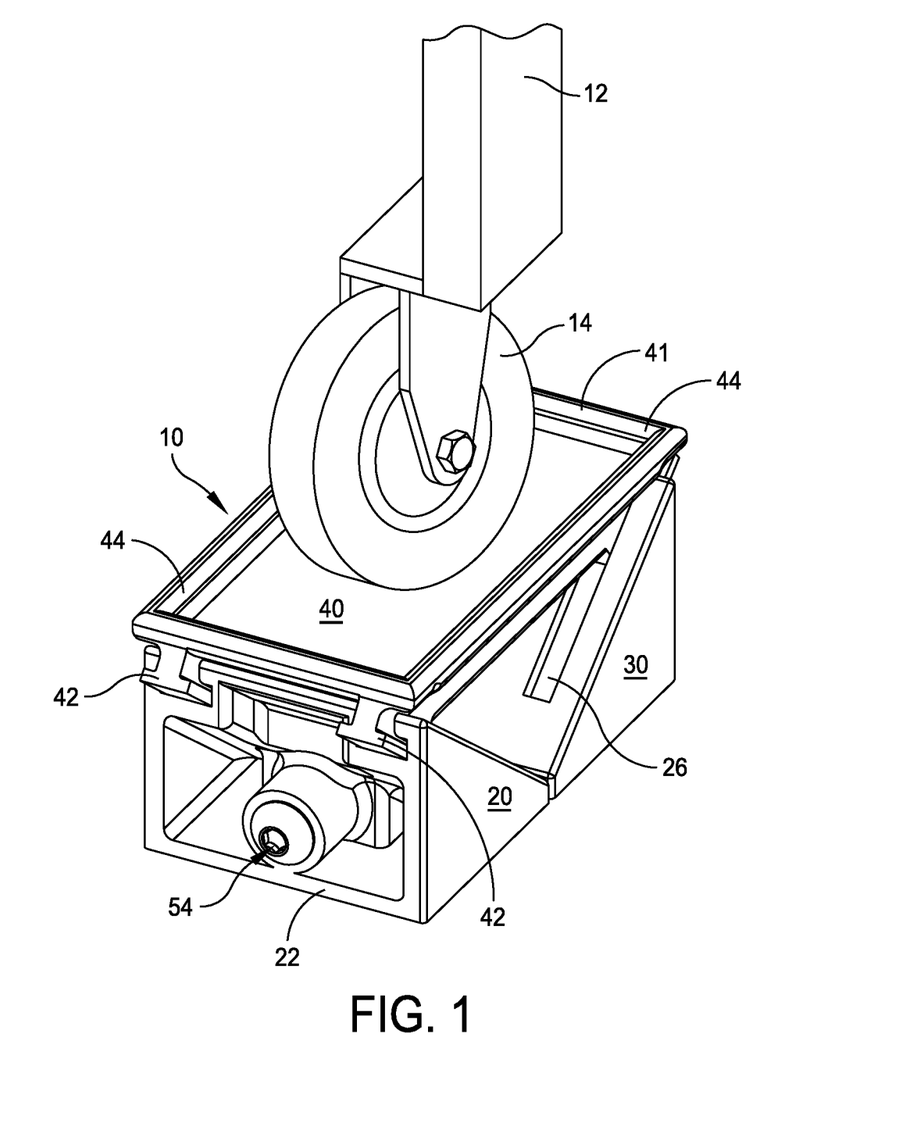
FIG. 1 is a perspective view illustrating the leveling device of the present invention as supporting a leg member.

Reference is now made to the drawings for an illustration of a preferred embodiment of the present invention. There is described a leveling device 10 for adjusting the height of a leg member 12 that is meant for the support of an apparatus or an item, such as a cooking grill. FIG. 1, for example, illustrates the leg 12 of the apparatus and a wheel 14 that is typically used at the bottom of the leg 12. The wheel 14 is shown resting upon a platform 40 that comprises part of the leveling device.

The leveling device is also comprised of a first support block 20 having a base 22 and a first tapered surface 24. In an opposite position to the first support block 20, there is provided a second support block 30 that has a base 32 and a second tapered surface 34.

The leveling device of the present invention is also comprised of the platform 40 upon which the leg member rests. The platform 40 has opposed ends 41 that engage with the respective first and second tapered surfaces of the first and second support blocks. In this connection, refer to the cross-sectional view of FIG. 5 which shows the peripheral lip 44 of the platform and the tapered surface at 45. The cross-sectional view of FIG. 5 clearly illustrates the manner in which the tapered surface 45 engages with the respective tapered block surfaces 24, 34.

Figure 2:
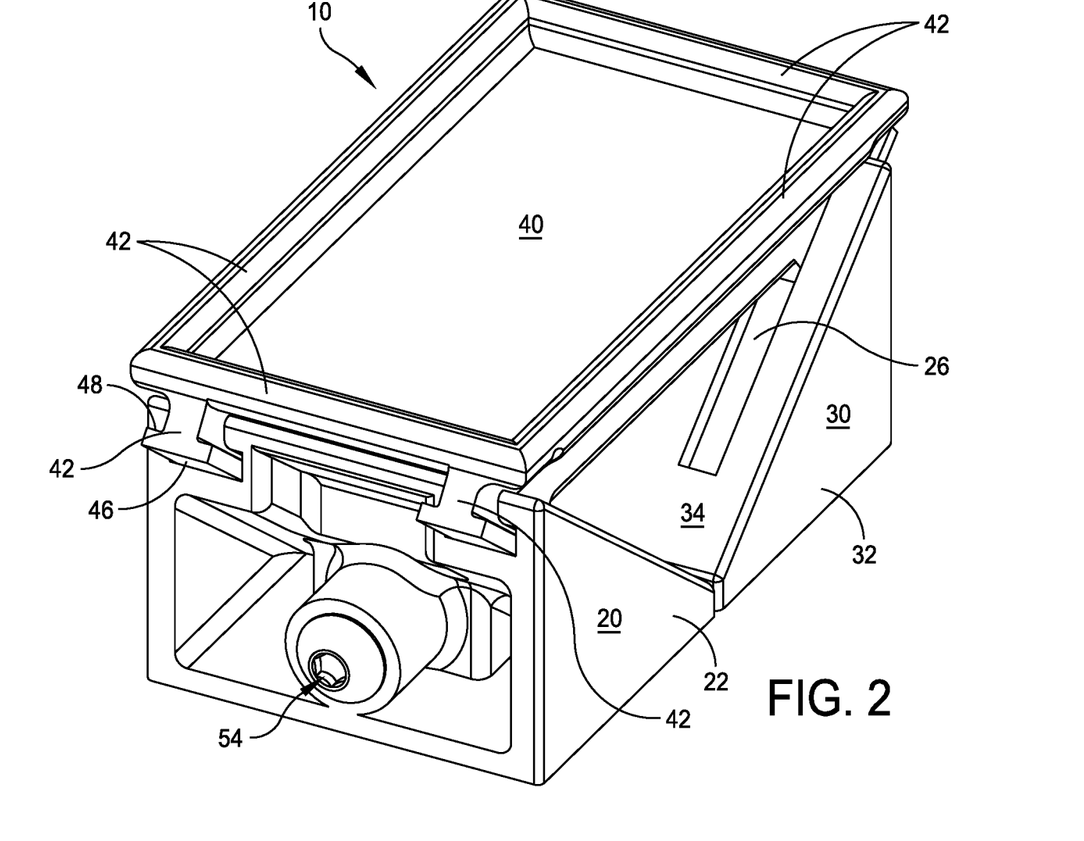
FIG. 2 is a perspective view of the leveling device shown in FIG. 1 with the support platform at its maximum height.
Figure 4:
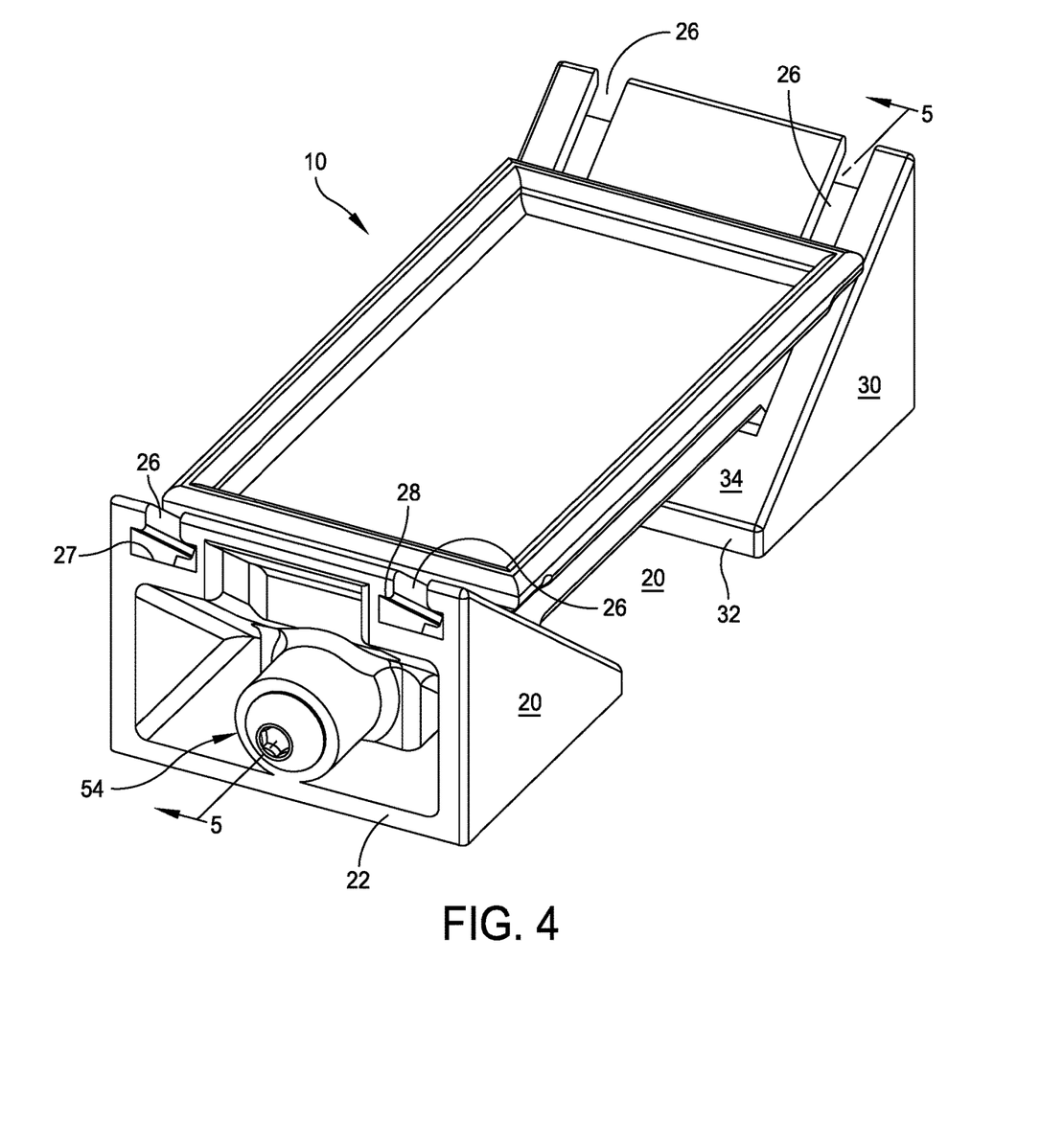
FIG. 4 is a perspective view similar to that shown in FIG. 2 but with the blocks in a more separated position and the platform in a lower position.

The leveling device of the present invention also includes a leadscrew 50 that connects between the respective first and second support blocks in order to move the first and second respective support blocks toward and away from each other. The movement of the first and second respective support blocks toward and away from each other causes the platform to raise and lower. In this connection FIGS. 1 and 2 illustrate the platform 40 in an upper position while FIG. 4 illustrates the platform in a lower position with the blocks 20, 30 separated apart. In the cross-sectional view of FIG. 5 the respective surfaces 24 and 34, may be disposed at different angular positions. However, the angle of surface 24 should match that of surface 34.

Figure 3:
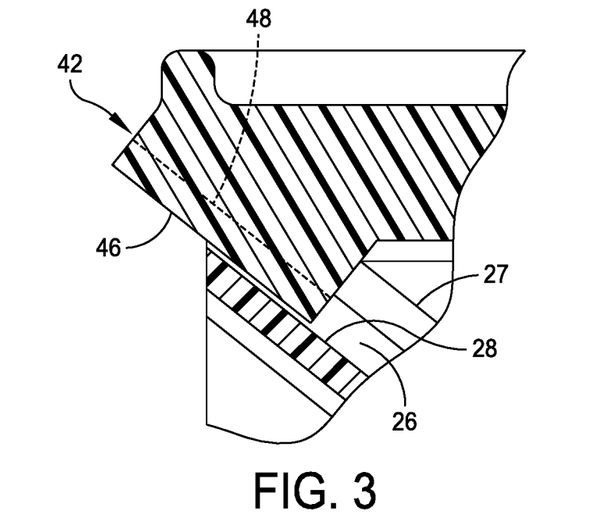
FIG. 3 is a fragmentary cross-sectional view at the slot/slide construction showing the interface between the platform and the support blocks.

With regard to the leadscrew 50, it has an operative or an adjustment end 54 that can be easily rotated in order to move the respective support blocks 20, 30 toward and away from each other. As also illustrated in the drawings, there are provided interlocking surfaces between the tapered surfaces 24, 34 of the respective first and second support blocks 20, 30, and the ends of the platform 40. In the illustrated embodiment this interlocking is provided by means of a pair of T-shaped slots 26 in the respective tapered surfaces. The perspective view of FIG. 4 clearly illustrates these T-shaped slots 26. The other part of the interlocking surfaces comprise T-shaped slides 42. Refer to FIGS. 1 and 2 that show these slides 42. The slides 42 are meant for direct engagement in the similarly shaped T-shaped slots 26. The fragmentary cross-sectional view of FIG. 3 also illustrates the slot and slide arrangement. In FIGS. 3 and 4 there is also illustrated the pair of top edges of the slot 26 at 27 and the top edge of the slot 26 at 28. The slots 26 in the disclosed embodiment are disposed in each support block while the slides are integrally formed with the platform 40.

Figure 5:
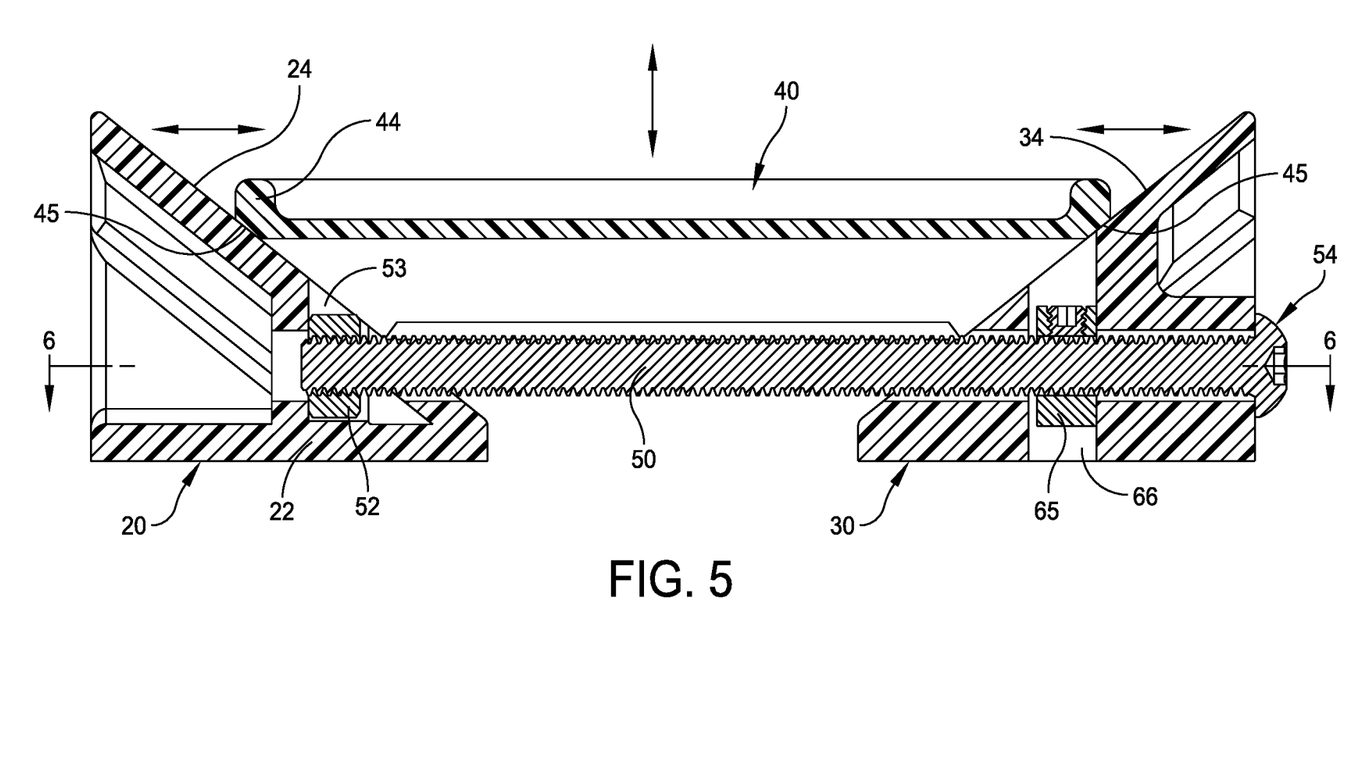
FIG. 5 is a cross-sectional view taken along line 5-5 of FIG. 4.
Figure 6:
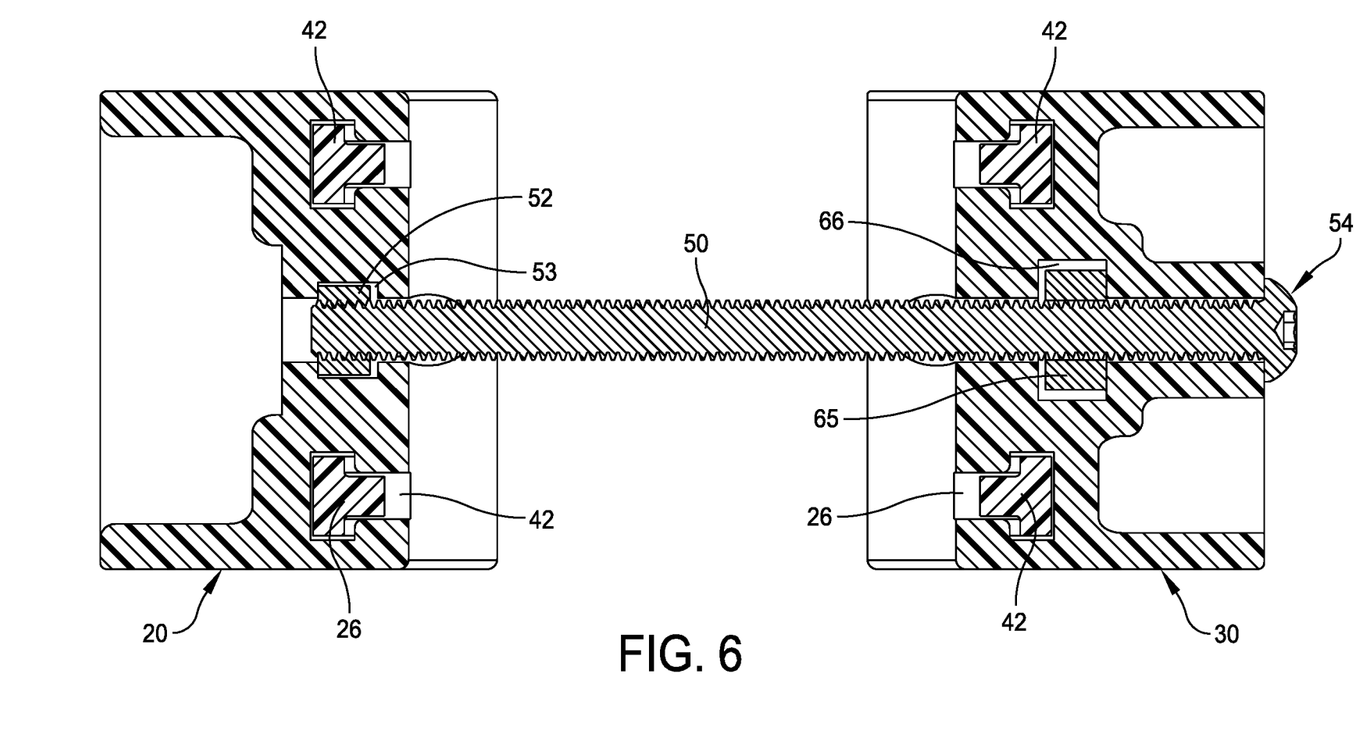
FIG. 6 is a cross-sectional view taken along line 6-6 of FIG. 5.
Figure 7:
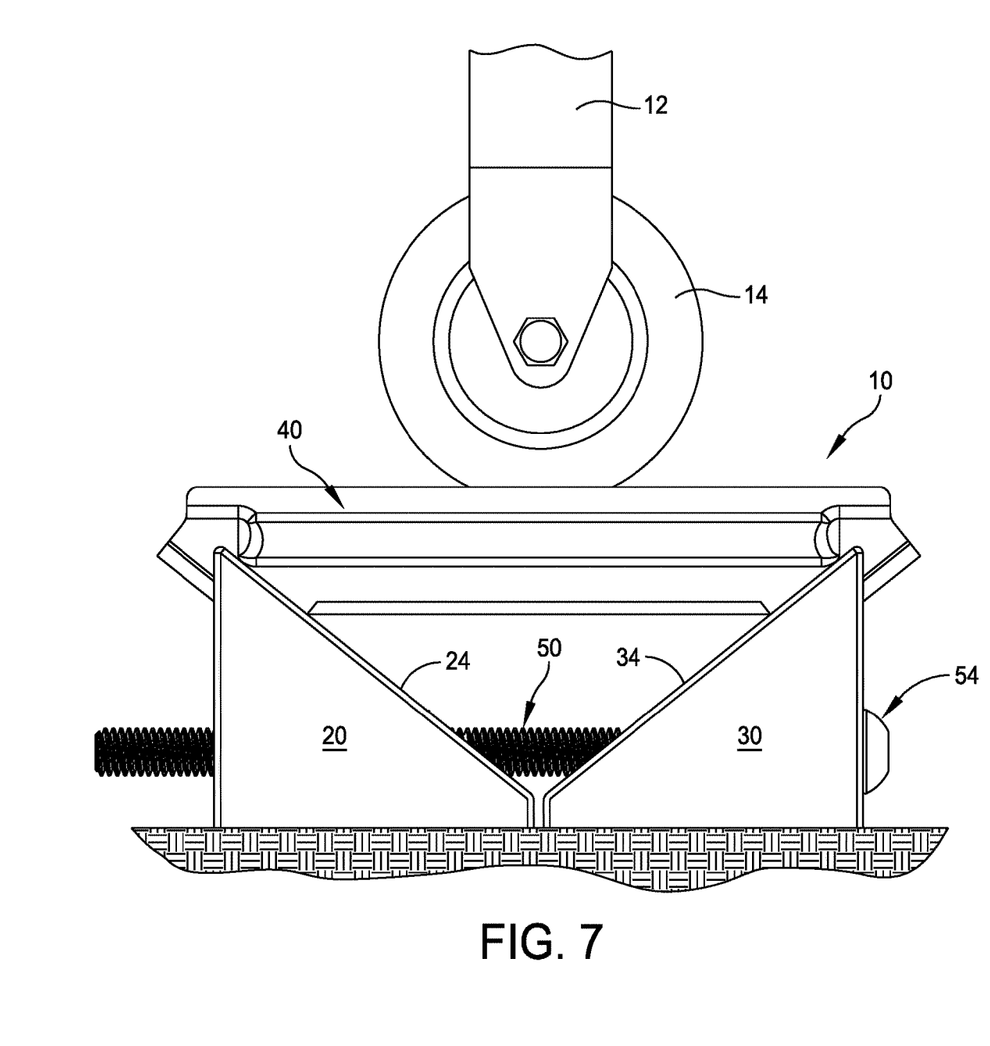
FIG. 7 is a side view of the leveling device with the platform at its maximum height.
Figure 8:
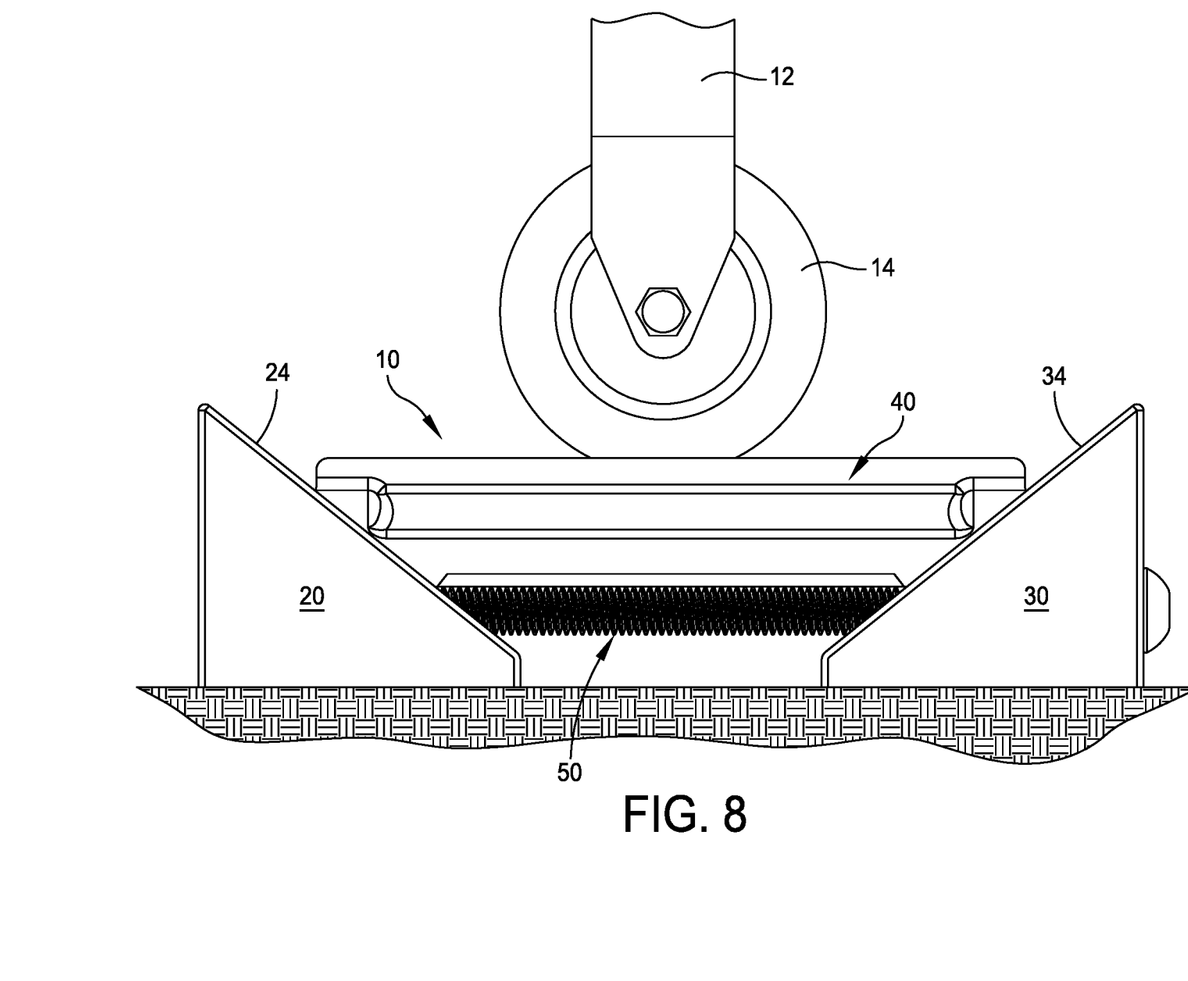
FIG. 8 is a side view illustrating the blocks separated with the platform at a lower position.
Figure 9:
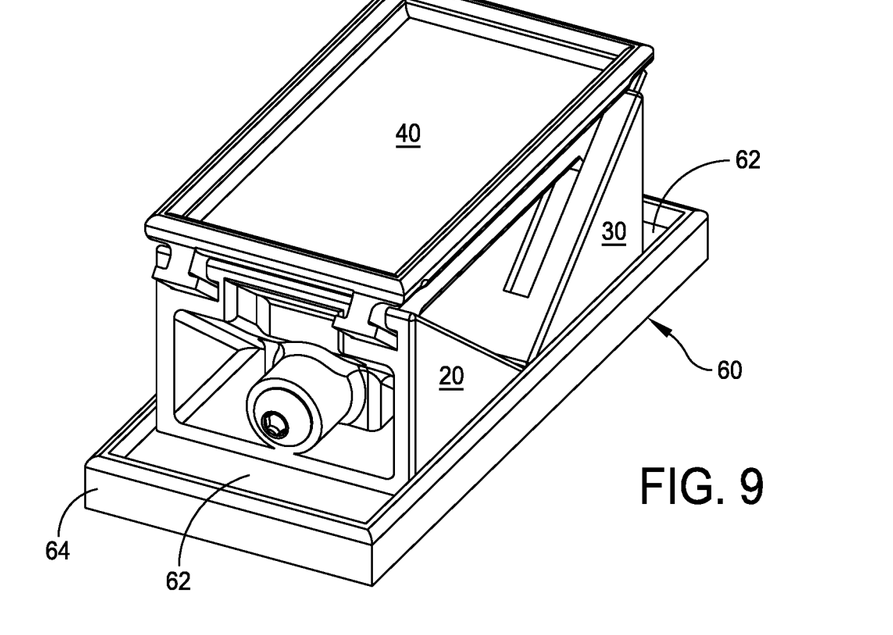
FIG. 9 is a perspective view showing an alternate feature of the present invention including a support foundation.

With further reference to FIGS. 5 and 6, it is noted that the leadscrew 50 engages nut 52. The nut 52 are captured within a recess 53 and are thus maintained in position. Upon the turning of the leadscrew 50 at its adjustment end 54, this has the effect of bringing the blocks 20 and 30 either closer together or farther apart. In this connection, reference may be made to the side view of FIG. 7 which shows the leadscrew adjustment controlling the support blocks 20 and 30 toward each other thus raising the platform 40. On the other hand, the side view of FIG. 8 illustrates the support blocks 20, 30 being controlled by the rotation of the leadscrew 50 so as to be separated part. This separation causes the platform 40 to move to a lower position.

When the leadscrew is turned, it threads into nut 53 forcing the support block 30 to move. At the same time, it forces the collar 65 against the side of the support block 20 causing it to move. Both of the support blocks 20 and 30 move close or further apart depending upon the direction of turning of the leadscrew 50.

The collar 65 uses a set screw on a leadscrew to hold it in place. It can spin freely in the recess but when the leadscrew is turned, it pushes against the wall of the support block and forces it to move. It is also possible to use a second nut but it would have to be left-hand threaded or it would move both blocks in the same direction which would not be effective.

Figure 10:
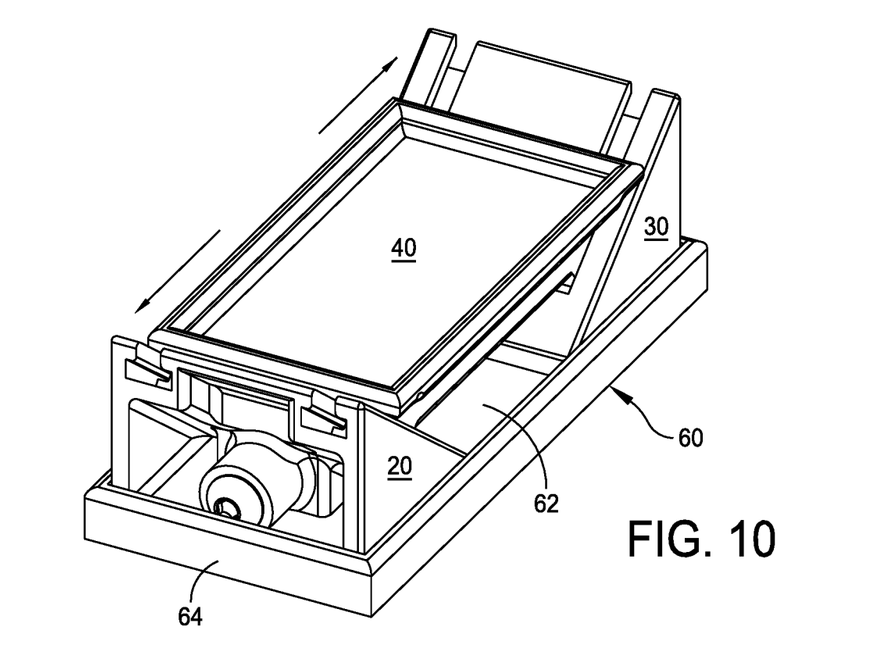
FIG. 10 is a perspective view showing the support foundation with the platform in its lower position.

As it is primarily the leadscrew 50 that ties the support blocks together, in an alternate embodiment of the present invention there may also be provided a foundation 60 that includes a foundation peripheral lip 64 disposed about a foundation recess 62. The longer sides of the lip 64 control the axial movement of the support blocks. The ends of the lip 64 may be considered as forming a stop particularly in the position of FIG. 10. This would limit the downward position of the platform 40. The structure of the leveling device of the present invention can be constructed of a variety of different materials but would be primarily constructed of a plastic material with metal hardware. Heavy items needing leveling might require metal components.

Having now described a limited number of embodiments of the present invention, it should now be apparent to those skilled in the art that numerous other embodiments and modifications thereof are contemplated as falling within the scope of the present invention, as defined by the appended claims. For example, although the interlocking is provided by the slide member on the platform and the slots in the blocks, an opposite arrangement may also be used where the slot is provided in the platform and the slides are provided associated with the support blocks.

REFERENCE NUMBER LIST leveling device 10
grill leg 12
leg wheel 14
first support block 20
base of first support block 22
tapered surface of first support block 24
T-shaped slot in the tapered surface 26
bottom edge of a slot 26 27
top edge of the slot 26 28
second support block 30
base of second support block 32
tapered surface of the second support block 34
platform 40
opposed ends of the platform 41
T-shaped slide in the platform 42
peripheral lip of the platform 44
tapered surface of the platform 40 45
bottom edge of the slide 42 46
top edge of the slide 42 48
leadscrew 50
nut 52
capture recess fitted to nut 53
leadscrew adjustment end 54
foundation 60
foundation recess 62
foundation peripheral lip 64
collar shaft lock 65
open recess 66

What is claimed is:

1. A leveling device for adjusting the height of a leg member that is meant for the support of an item, said leveling device comprising:
   a first support block having a base and a first tapered surface;
   a second support block having a base and a second tapered surface;
   said first and second support blocks constructed and arranged with the respective tapered surfaces in facing relationship;
   a platform upon which the leg rests;
   said platform having opposed ends that engage with respective first and second tapered surfaces of the respective first and second support blocks;
   and a leadscrew that connects between the respective first and second blocks in order to move the respective first and second support blocks toward and away from each other;
   the movement of the respective first and second support blocks toward and away from each other causing the platform to respectively raise and lower.

2. The leveling device of claim 1 wherein the respective first and second tapered surfaces extend substantially at a 90 degree angle.

3. The leveling device of claim 1 wherein the respective first and second tapered surfaces taper at substantially the same angle.

4. The leveling device of claim 1 wherein the opposed ends of the platform are also tapered to match the respective first and second tapered surfaces of the respective first and second support blocks.

5. The leveling device of claim 1 wherein the leadscrew has an operative end that can be rotated in order to move the respective support blocks toward and away from each other.

6. The leveling device of claim 1 including interlocking surfaces between the tapered surfaces of the respective first and second support blocks, and the ends of the platform.

7. The leveling device of claim 6 wherein the interlocking surfaces are formed by a slot and an accommodating slide.

8. The leveling device of claim 1 including a foundation upon which the respective first and second support blocks rest.

9. The leveling device of claim 8 wherein the foundation has a slot in which the respective first and second support blocks may slide.

10. The leveling device of claim 1 wherein the item is a cooking grill having multiple legs, each being supported by a leveling device.

11. A combination of a piece of equipment and a leveling device that is for adjusting the height of the piece of equipment, said piece of equipment including at least one support leg, the leveling device comprising: a first support block having a base and a first tapered surface; a second support block having a base and a second tapered surface; said first and second support blocks constructed and arranged with the respective tapered surfaces in facing relationship; a platform upon which the support leg rests; said platform having opposed ends that engage with respective first and second tapered surfaces of the respective first and second support blocks; and an adjustment member that connects between the respective first and second blocks in order to move the respective first and second support blocks toward and away from each other; the movement of the respective first and second support blocks toward and away from each other causing the platform to respectively raise and lower, and in turn raise and lower the support leg.

12. The leveling device of claim 11 wherein the respective first and second tapered surfaces extend substantially at a 90 degree angle; and wherein the respective first and second tapered surfaces taper at substantially the same angle.

13. The leveling device of claim 11 wherein the opposed ends of the platform are also tapered to match the respective first and second tapered surfaces of the respective first and 2 second support blocks.

14. The leveling device of claim 11 including interlocking surfaces between the tapered surfaces of the respective first and second support blocks, and the ends of the platform.

15. The leveling device of claim 14 wherein the interlocking surfaces are formed by a slot and an accommodating slide.

16. The leveling device of claim 11 including a foundation upon which the respective first and second support blocks rest.

17. The leveling device of claim 16 wherein the foundation has a slot in which the respective first and second support blocks may slide.

18. A method of adjusting the height of an apparatus that has a plurality of support legs, the adjusting being performed by the ability to raise and lower the legs, so as to in turn raise and lower the apparatus, said method comprising providing a leveling device upon which the support legs rest, and that includes a first support block having a base and a first tapered surface; a second support block having a base and a second tapered surface; said first and second support blocks constructed and arranged with the respective tapered surfaces in facing relationship; a platform upon which the support leg rests; said platform having opposed ends that engage with respective first and second tapered surfaces of the respective first and second support blocks; and an adjustment member that connects between the respective first and second blocks, said method further comprising operating the adjustment member in order to move the respective first and second support blocks toward and away from each other; the movement of the respective first and second support blocks toward and away from each other causing the platform to respectively raise and lower, and in turn raise and lower the support legs and apparatus.

19. The method of claim 18 wherein the opposed ends of the platform are also tapered to match the respective first and second tapered surfaces of the respective first and second support blocks.

20. The method of claim 18 including providing a foundation upon which the respective first and second support blocks rest.

* * * * *